(12) United States Patent
Bischel

(10) Patent No.: US 10,194,678 B2
(45) Date of Patent: Feb. 5, 2019

(54) FROZEN BEVERAGE MACHINE VALVING

(71) Applicant: TAYLOR COMMERCIAL FOODSERVICE INC., Rockton, IL (US)

(72) Inventor: Kevin H. Bischel, Rockton, IL (US)

(73) Assignee: TAYLOR COMMERCIAL FOODSERVICE INC., Rockton, IL (US)

( * ) Notice: Subject to any disclaimer, the term of this patent is extended or adjusted under 35 U.S.C. 154(b) by 0 days.

(21) Appl. No.: 15/259,665

(22) Filed: Sep. 8, 2016

(65) Prior Publication Data
US 2017/0064977 A1 Mar. 9, 2017

Related U.S. Application Data

(60) Provisional application No. 62/215,993, filed on Sep. 9, 2015.

(51) Int. Cl.
  *A23G 9/22* (2006.01)
  *A23G 9/06* (2006.01)
  (Continued)

(52) U.S. Cl.
  CPC ............. *A23G 9/228* (2013.01); *A23G 9/045* (2013.01); *A23G 9/06* (2013.01); *A23G 9/222* (2013.01);
  (Continued)

(58) Field of Classification Search
  CPC .. B67D 1/0858; B67D 1/0036; B67D 1/1277; B67D 1/0857; B67D 1/0016;
  (Continued)

(56) References Cited

U.S. PATENT DOCUMENTS 4,568,026 A * 2/1986 Baun ....................... B21B 27/10
                                                        137/883
5,179,970 A    1/1993 Jarocki et al.
(Continued)

FOREIGN PATENT DOCUMENTS

EP     2889262 A1   1/2015
WO  2013/164779 A1  11/2013
WO  2015/044018 A2   4/2015

OTHER PUBLICATIONS

Operator's Manual Model 345/346/349/355 Slush Freezers, Jun. 19, 2001, Taylor Company, Rockton, Illinois.
Operator's Manual Model C302 Slush Freezer, Jun. 22, 2004, Taylor Company, Rockton, Illinois.
Patented Bullet Valve Technology, Aug. 3, 2015, Mac Valves, Inc., Wixom, Michigan.

*Primary Examiner* — Donnell Long
(74) *Attorney, Agent, or Firm* — Brinks Gilson & Lione

(57) ABSTRACT

A dispensing apparatus has: a freezing cylinder; a water flowpath; a first controllable valve along the water flowpath; a syrup flowpath; and a second controllable valve along the syrup flowpath. The flowpaths merge as a water/syrup flowpath to the freezing cylinder. The first controllable valve and the second controllable valve each have: a valve body having a cartridge compartment, an inlet to the cartridge compartment, and an outlet from the cartridge compartment; and a valve cartridge. The valve cartridge has: a cartridge body mounted in the cartridge compartment; a valve element carried by the cartridge body; and a solenoid carried by the cartridge body and coupled to the valve element to drive movement of the valve element. The valve element is shiftable between a first condition permitting communication between the inlet and the outlet and a second condition blocking communication between the inlet and the outlet.

17 Claims, 6 Drawing Sheets

(51) Int. Cl.
- *A23G 9/28* (2006.01)
- *A23G 9/04* (2006.01)
- *B67D 1/00* (2006.01)
- *B67D 1/08* (2006.01)
- *B67D 1/12* (2006.01)
- *B67D 1/04* (2006.01)

(52) U.S. Cl.
CPC ............ *A23G 9/28* (2013.01); *B67D 1/0016* (2013.01); *B67D 1/0036* (2013.01); *B67D 1/0857* (2013.01); *B67D 1/0858* (2013.01); *B67D 1/1277* (2013.01); *B67D 1/004* (2013.01); *B67D 1/0018* (2013.01); *B67D 1/0057* (2013.01); *B67D 1/0406* (2013.01); *B67D 1/0462* (2013.01); *B67D 1/0888* (2013.01); *B67D 1/1243* (2013.01); *B67D 2001/0093* (2013.01); *B67D 2001/0094* (2013.01); *B67D 2001/0828* (2013.01); *B67D 2001/1259* (2013.01)

(58) Field of Classification Search
CPC .......... B67D 1/0018; B67D 2001/0828; B67D 2001/0094; B67D 1/1243; B67D 1/0888; B67D 2001/1259; B67D 1/0462; B67D 1/0406; B67D 1/0057; A23G 9/045; A23G 9/28; A23G 9/222; A23G 9/06

See application file for complete search history.

(56) References Cited

U.S. PATENT DOCUMENTS

| | | | |
|---|---|---|---|
| 5,381,926 | A | 1/1995 | Credle, Jr. et al. |
| 6,193,109 | B1 | 2/2001 | Credle, Jr. et al. |
| 6,435,375 | B2 | 8/2002 | Durham et al. |
| 6,685,054 | B2 | 2/2004 | Kameyama |
| 6,994,231 | B2 | 2/2006 | Jones |
| 7,077,290 | B2 | 7/2006 | Bethuy et al. |
| 7,278,276 | B2 | 10/2007 | Boyer et al. |
| 8,371,477 | B2 | 2/2013 | Klopfenstein et al. |
| 8,424,725 | B2 | 4/2013 | Boyer |
| 8,528,786 | B2 | 9/2013 | Gates |
| 9,074,699 | B2 | 7/2015 | Jamison et al. |
| 2008/0073376 | A1* | 3/2008 | Gist .................. A23G 9/045 222/145.5 |
| 2008/0083260 | A1* | 4/2008 | Watson .................. G01N 30/24 73/1.05 |
| 2010/0127015 | A1* | 5/2010 | Boyer .................. B67D 1/0036 222/1 |
| 2011/0120163 | A1* | 5/2011 | Wadle .................... A23G 9/228 62/228.1 |
| 2012/0138632 | A1 | 6/2012 | Li et al. |
| 2014/0261804 | A1 | 9/2014 | Neff et al. |
| 2015/0027315 | A1 | 1/2015 | Lüssi et al. |

\* cited by examiner

FROZEN BEVERAGE MACHINE VALVING

CROSS-REFERENCE TO RELATED APPLICATION

Benefit is claimed of U.S. Patent Application No. 62/215,993, filed Sep. 9, 2015, and entitled "Frozen Beverage Machine Valving", the disclosure of which is incorporated by reference herein in its entirety as if set forth at length.

BACKGROUND

The disclosure relates to frozen beverage machines. More particularly, the disclosure relates to fluid valving for frozen beverage machines.

Frozen beverage machines (including frozen carbonated beverage (FCB)) machines introduce a mixture of water and syrup to a freezing cylinder. The freezing cylinder forms a heat absorption heat exchanger of a refrigeration system. The freezing cylinder includes a beater or the like which is driven for rotation about an axis of the cylinder to maintain desired consistency of the frozen beverage within the cylinder. In FCB machines, carbon dioxide gas may be mixed with the water, syrup, and or their mixture at one or more locations. An exemplary water source is building potable water connected to the machine. An exemplary syrup source is a syrup bag (e.g., bag-in-box) or pouch (collectively "bag") externally connected to the machine (alternatives including internal mounting for small bags). A carbon dioxide gas source for an FCB machine may be a tank externally connected to the machine.

In frozen beverage equipment it is critical to control the ratio of the flows of water and syrup. Exemplary flow control devices used in frozen beverage machines have assemblies that rely on an adjustable spring force acting on a sliding ceramic piston to create a variable orifice. An example is discussed as background in U.S. Pat. No. 8,424,725 of Boyer, Apr. 11, 2013. A technician may manually adjust the flow control assemblies with a screwdriver. The sticky syrup can solidify and jam the flow control device's piston requiring significant technician time to fix.

SUMMARY

One aspect of the disclosure involves a dispensing apparatus comprising: a freezing cylinder; a water flowpath; a first controllable valve along the water flowpath; a syrup flowpath, merging with the water flowpath and proceeding as a water/syrup flowpath to the freezing cylinder; and a second controllable valve along the syrup flowpath. The first controllable valve and the second controllable valve each comprise: a valve body having a cartridge compartment, an inlet to the cartridge compartment, and an outlet from the cartridge compartment; and a valve cartridge. The valve cartridge comprises: a cartridge body mounted in the cartridge compartment; a valve element carried by the cartridge body and shiftable between a first condition permitting communication between the inlet and the outlet and a second condition blocking communication between the inlet and the outlet; and a solenoid carried by the cartridge body and coupled to the valve element to drive movement of the valve element.

In one or more embodiments of any of the foregoing embodiments, for the first controllable valve and the second controllable valve the cartridge body: is captured to the body by a capture plate; has a threaded engagement with the valve body; and/or has a snap-fit engagement with the valve body.

In one or more embodiments of any of the foregoing embodiments, the apparatus further comprises: a carbon dioxide flowpath merging with the water/syrup flowpath.

In one or more embodiments of any of the foregoing embodiments, the apparatus further comprises a mix reservoir along the water/syrup flowpath. The carbon dioxide flowpath comprises: a first branch extending to the mix reservoir; and a second branch extending to the water/syrup flowpath downstream of the mix reservoir.

In one or more embodiments of any of the foregoing embodiments, a carbon dioxide tank is connected to the carbon dioxide flowpath.

In one or more embodiments of any of the foregoing embodiments, the first controllable valve and the second controllable valve have identical cartridges.

In one or more embodiments of any of the foregoing embodiments, a controller is configured for pulse width modulated operation of the first controllable valve and the second controllable valve have identical cartridges.

In one or more embodiments of any of the foregoing embodiments, the controller comprises: a main controller; and a manually-adjustable pulse width modulated timing circuit intervening between the main controller and the first controllable valve and the second controllable valve.

In one or more embodiments of any of the foregoing embodiments, the controller is configured to output separate pulse width modulated power to the first controllable valve and the second controllable valve.

In one or more embodiments of any of the foregoing embodiments, the apparatus further comprises a refrigeration system with the freezing cylinder as a heat exchanger.

In one or more embodiments of any of the foregoing embodiments, the freezing cylinder is a first of a plurality of freezing cylinders. Each of the plurality of freezing cylinders beyond the first also has associated therewith a first controllable valve and a second controllable valve each comprising: a valve body having a cartridge compartment, an inlet to the cartridge compartment, and an outlet from the cartridge compartment; and a valve cartridge. The valve cartridge comprises: a cartridge body mounted in the cartridge compartment; a valve element carried by the cartridge body and shiftable between a first condition permitting communication between the inlet and the outlet and a second condition blocking communication between the inlet and the outlet; and a solenoid carried by the cartridge body and coupled to the valve element to drive movement of the valve element.

In one or more embodiments of any of the foregoing embodiments, a single piece forms main portions of the valve bodies in common associated with the plurality of cylinders.

In one or more embodiments of any of the foregoing embodiments, a method comprises running the freezing cylinder to discharge a product from an outlet.

In one or more embodiments of any of the foregoing embodiments, the method further comprises: removing, as a unit, the valve cartridge of one or both of the first controllable valve and the second controllable valve; and replacing, as a unit, the removed cartridge with a replacement cartridge.

In one or more embodiments of any of the foregoing embodiments, the removing comprises removing a capture plate.

In one or more embodiments of any of the foregoing embodiments, the method further comprises providing separate pulse width modulated power to the first controllable valve and the second controllable valve.

In one or more embodiments of any of the foregoing embodiments, the separate pulse width modulated power to the first controllable valve and the second controllable valve are of different duty cycles.

In one or more embodiments of any of the foregoing embodiments, the method further comprises manually adjusting the different duty cycles.

In one or more embodiments of any of the foregoing embodiments, the manually adjusting is of respective timing circuits intervening between a main controller and the first controllable valve and the second controllable valve.

In one or more embodiments of any of the foregoing embodiments, the method is used to dispense a frozen carbonated beverage product.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
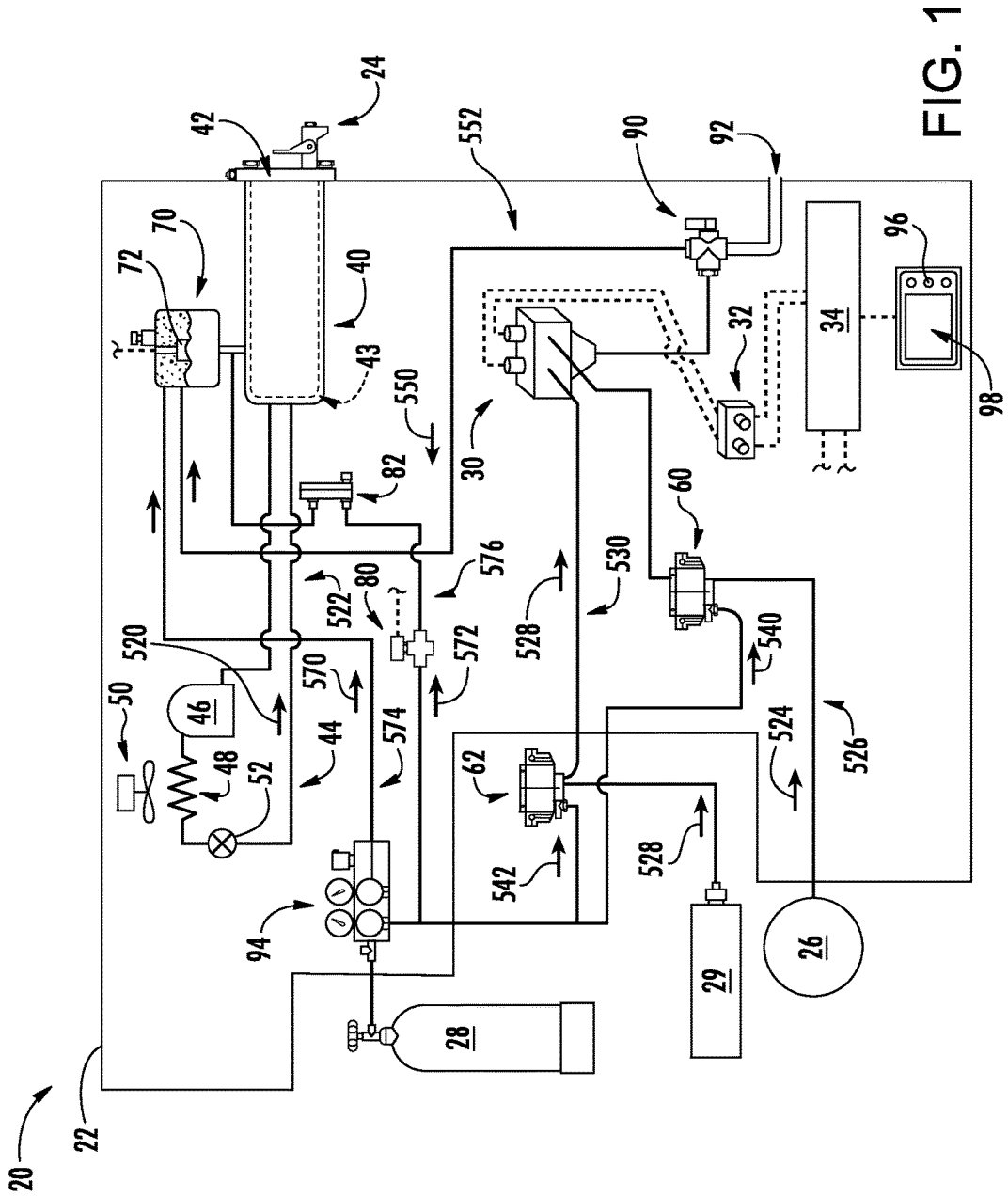
FIG. 1 is a partially schematic view of a frozen carbonated beverage (FCB) dispensing system.

FIG. 1 shows a frozen carbonated beverage (FCB) dispensing system comprising an FCB dispensing apparatus (machine) 20 having a housing 22 and a dispensing outlet 24. The machine has external inputs of electricity (not shown) and potable water 26 (e.g., from the building potable water supply). The machine further includes an external input of pressurized carbon dioxide gas 28 (e.g., an external tank and regulator connected to an appropriate fitting on the apparatus). A further external input includes one or more sources of flavored syrup 29 (e.g., a bag as discussed above). Depending upon the particular implementation, the carbon dioxide supply 28 and the syrup supply 29 may be substantially remote of the machine (such as in a service room) with the machine being located behind the counter in a restaurant or along a buffet line or the like.

As is discussed further below, the illustrated machine 20 reflects a retrofit or a minimal reengineering of a baseline machine 21 of FIG. 2. As is discussed further below, the machine 20 features a flow control unit 30 replacing a baseline flow control unit 31. The flow control unit 30 operates via pulse width modulation (PWM); whereas the flow control unit 31 does not. In order to accommodate the flow control unit 30, a manually-adjustable timing circuit 32 is added between the flow control unit 30 and the existing controller 34. The timing circuit 32 thus converts the non-PWM output of the controller 34 as is used to control the flow control unit 31 into a PWM output appropriate for the flow control unit 30. The timing circuit may represent a single unit (e.g., having a single housing) containing separate timing circuits and separate adjusters for each of the associated solenoid valves. The manual adjustment may be of the duty cycle of the valve. This allows for different duty cycles of the two valves to accommodate the different quantities and/or properties of the fluids they must pass.

Details of the flow control unit 30 and its operation are discussed below. Other details of the exemplary FIG. 1 system may generally correspond to that of the baseline FIG. 2 system or other baseline system. FIGS. 1 and 2 show details of a single-cylinder, single-flavor system. Other systems involve multiple cylinders and multiple flavors. Such multiple-cylinder systems may have multiples of certain components that are individually associated with the cylinder while sharing other components (such as having a single external connection for water and a single external connection for carbon dioxide and sharing components of a refrigeration system).

Figure 2:
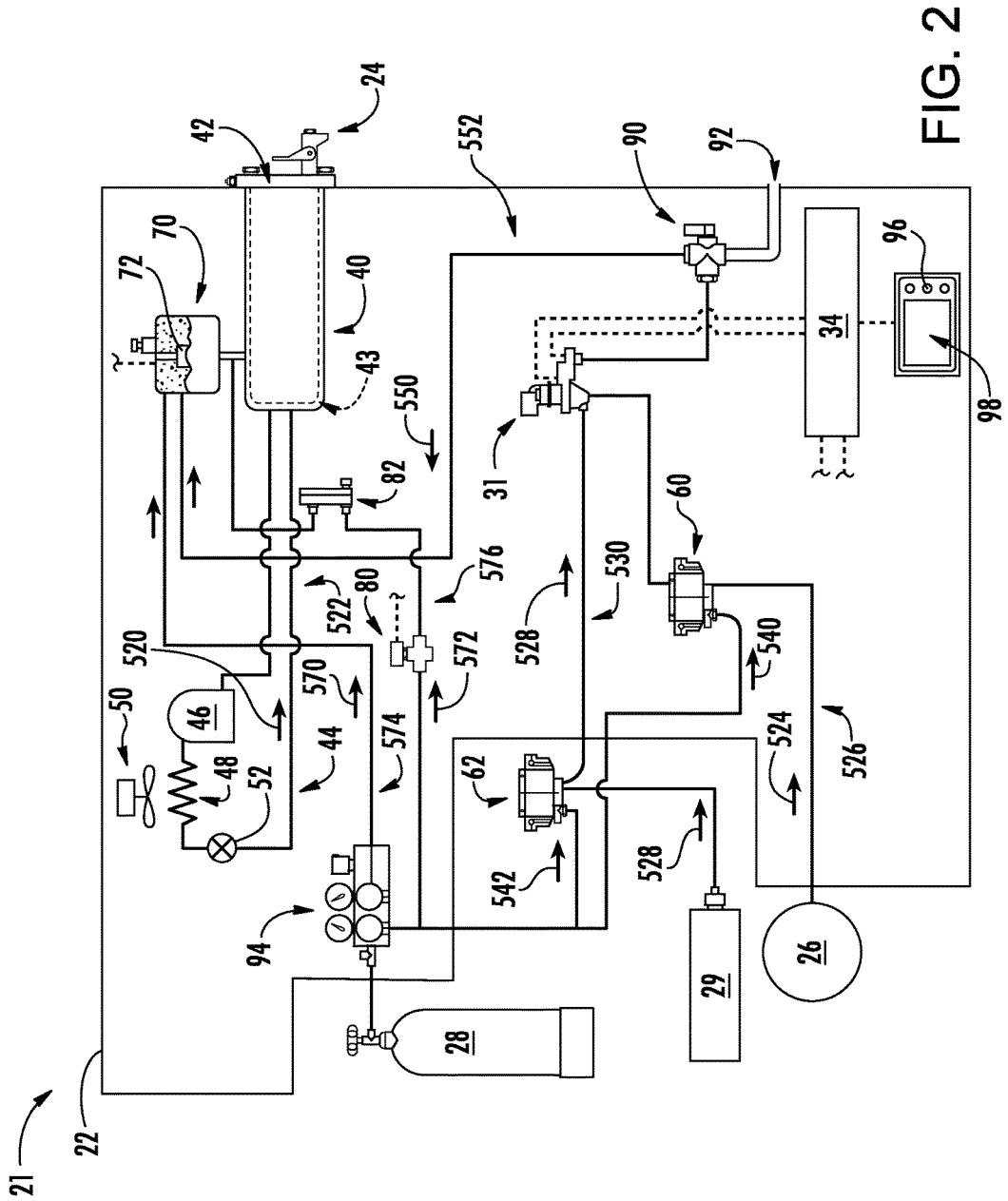
FIG. 2 is a partially schematic view of a baseline FCB dispensing system.

In the exemplary illustrated configuration of FIGS. 1 and 2, a freezing cylinder 40 has an interior containing the frozen carbonated beverage. The exemplary dispensing outlet 24 is on a manually-actuated valve on a door 42 of the freezing cylinder. A beater and/or scraper (not shown) may be rotatably mounted within the freezing cylinder and driven by a motor (also not shown). The freezing cylinder forms a heat exchanger 43 of a refrigeration system 44. The exemplary refrigeration system 44 is a vapor compression system having a compressor 46 for driving a flow 520 refrigerant along a recirculating refrigerant flowpath. In a normal cooling mode flow proceeds downstream from the compressor 46 to a heat exchanger 48 (a heat rejection heat exchanger or condenser or gas cooler in the cooling mode). The exemplary heat exchanger 48 may be a refrigerant-air heat exchanger across which a fan 50 drives an air flow drawn from an inlet in the housing 22 and expelled from an outlet in the housing 22. The refrigerant proceeds further downstream through an expansion device 52 and then to the heat exchanger 43 (acting as a heat absorption heat exchanger) of the freezing cylinder to maintain the freezing cylinder at an appropriate temperature below ambient.

FIG. 1 further shows a flow of water 524 along a water flowpath 526 from the water source 26. A syrup flow 528 proceeds on a syrup flowpath 530 from the syrup source 29.

In an exemplary embodiment, several flows of carbon dioxide are involved. FIG. 1 shows a pump 60 along the water flowpath 26 for pumping water along that flowpath and a pump 62 along the syrup flowpath 530 for pumping the syrup flow 528 along that flowpath. The exemplary pump 60 and 62 are driven by carbon dioxide gas from the source 28. Accordingly, carbon dioxide flows 540 and 542 are passed to those respective pumps to drive the pumps but are then discharged to atmosphere.

As is discussed further below, the water flowpath 526 and syrup flowpath 530 merge so that a combined water/syrup flow 550 proceeds downstream along a merged water/syrup flowpath 552. The exemplary merger is at or downstream of the flow control unit 30. Carbon dioxide may be passed from the source 28 to join the merged flowpath 552 at one or more locations. The exemplary baseline system provides two such flows 570 and 572 along respective carbon dioxide flowpaths 574 and 576. The exemplary flowpath 574 extends to a reservoir 70 upstream of the cylinder interior along the water/syrup flowpath 552. The exemplary flowpath 576 joins the water/syrup flowpath 552 between the reservoir (mix tank) 70 and freezing cylinder. The exemplary reservoir 70 thus includes respective inlets along the flowpaths 552 and 570 and an outlet along the continuation of the flowpath 552 to the freezing cylinder. The exemplary reservoir 70 is used to maintain the freezing cylinder in a full condition without requiring continuous flows of water and syrup. Thus, for example, the amount of water/syrup mix in the reservoir may progressively decrease from an initial fully charged condition to a depleted condition whereupon the controller may cause the reservoir to be re-filled with mix. In the exemplary embodiment, one or more level sensors or switches (e.g., float switches) 72 may be coupled to the controller 34 to provide information on the fill status of the reservoir.

Alternative reservoirs feature a bladder that may be pressurized (e.g., with carbon dioxide) to occupy the space not filled with the mix. As mix depletes, the pressure causes the bladder to expand and the pressure to drop. The controller senses the pressure drop via a pressure sensor and then refills the reservoir with mix.

In the exemplary embodiment, the flow 570 is used to pressurize the reservoir so that the pressure drives liquid flow from the reservoir into the freezing cylinder and, when the freezing cylinder valve is open, frozen product is driven out of the dispensing outlet 24. The flow 570 thus may introduce some portion of the carbon dioxide to carbonate the FCB. The remaining carbonation may come from the flow 572. To achieve this, the exemplary flowpath 576 includes a valve 80 (e.g., a solenoid valve) controlled by the controller 34 and a flow meter device 82 (e.g. a manually adjusted needle valve with a built-in "ball float" flow gauge).

FIG. 1 also shows a sampling valve 90 along the water/syrup flowpath 552 and coupled to a sampling outlet 92 allowing a user to sample the mix to evaluate its composition and the like. FIG. 1 also shows a multi-pressure carbon dioxide manifold 94 for providing appropriate pressures to various system locations. Other features such as filters, additional pressure regulators, sensors, and the like are not shown but may be as appropriate for any baseline or original design system.

Figure 3:
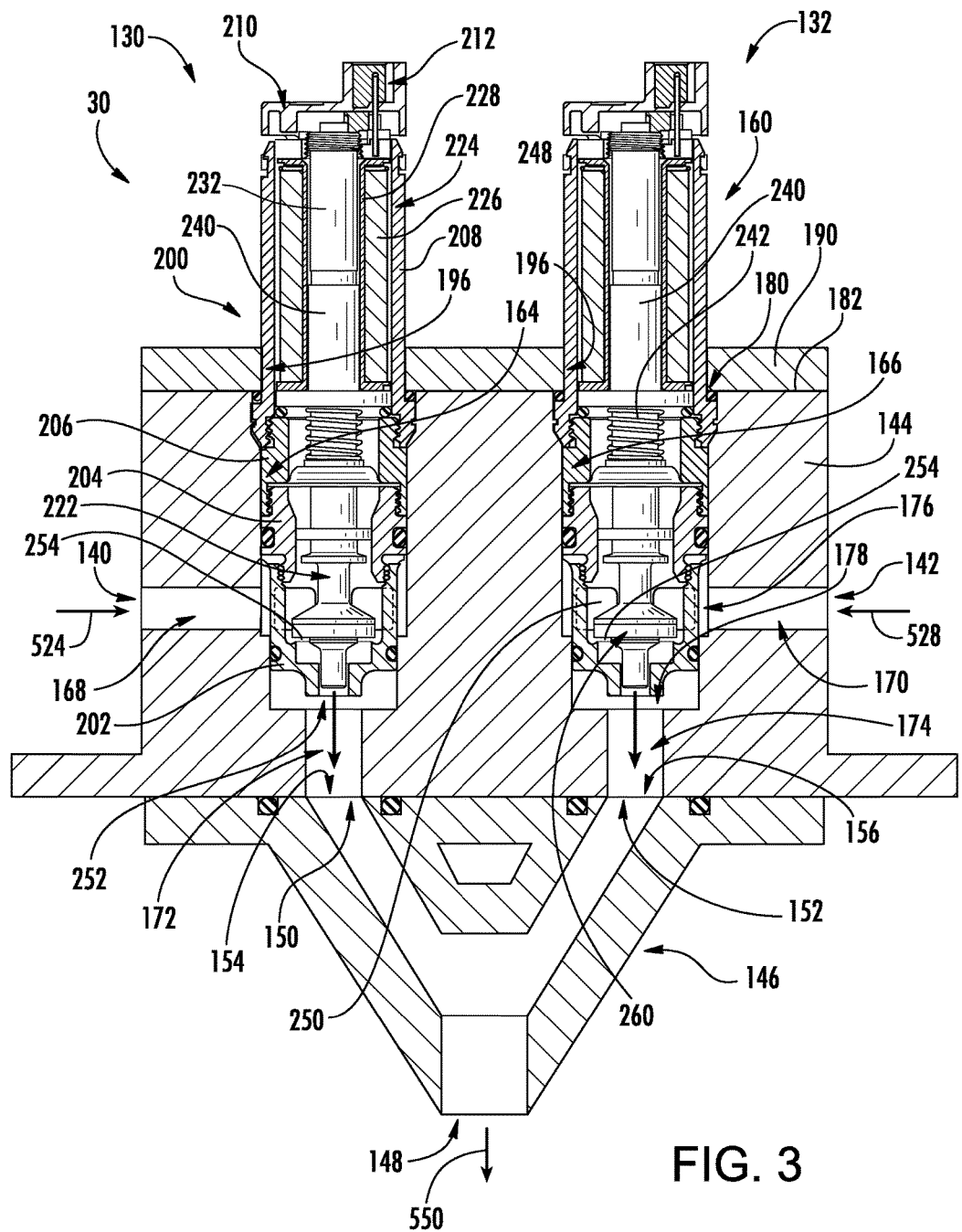
FIG. 3 is a view of a valve assembly.

FIG. 3 shows an exemplary flow control device 30 that forms twinned valves 130 and 132 for the water and syrup respectively. The exemplary flow control device 30 has a water inlet 140 and a syrup inlet 142. These exemplary inlets are along a main segment 144 (main body) of a body of the device (thus forming a shared body of the valves 130 and 132). The body of the device further includes a blend fitting 146 for blending the two flows 524 and 528. The blend fitting has an outlet 148 for discharging the merged flow 550 and forming an outlet of the exemplary flow control unit. Thus, the main body 144 has respective water and syrup outlets 150, 152 at respective water and syrup inlets 154, 156 of the blend fitting.

Each of the valves 130, 132 includes a valve cartridge 160 respectively associated with the water and syrup flows. The cartridges are respectively mounted in compartments 164, 166 in the valve main body 144. The compartments are respectively open to inlet passageways 168, 170 from respective inlets 140, 142 and to outlet passageways 172, 174 to the respective outlets 150, 152. Each exemplary compartment has an inlet 176 from the associated inlet passageway and an outlet 178 to the associated outlet passageway.

Each exemplary compartment has an opening 180 along a surface 182 of the valve main body. The exemplary cartridges protrude through such openings. There are several possible configurations of valve cartridge. Some configurations are screw-in configurations wherein a portion of the cartridge body is externally threaded and engages a complementary internal thread of the compartment. Other configurations may have a detented snap-in action such as via a groove on the cartridge body engaging a detent on the valve body. Other configurations involve a locking ring or locking pin extending through a channel on the exterior of the cartridge body and similarly engaged by the valve body. The illustrated configuration involves a capture plate 190 secured to the main body 144 at the surface 182 and fastened to the main body such as via screws. The capture plate has apertures 196 passing reduced-diameter outboard portions of the cartridge bodies so that an underside of the capture plate captures a shoulder of the cartridge body to retain the cartridge body against extraction.

Servicing of the cartridge valves may thus involve unscrewing or otherwise disengaging the capture plate, removing the capture plate, and then extracting the cartridges (e.g., via hand or with a gripping tool such as a pair of pliers). Installation of a cartridge or a replacement cartridge may simply be via hand insertion followed by placement of the capture plate and then screwing down or otherwise securing the capture plate. For the alternative screw-in or snap-in cartridges, removal is by unscrewing or unsnapping and installation is via screwing or snapping in.

The illustrated cartridges are one particular configuration of cartridge valve produced by Mac Valves, Inc. of Wixom, Mich. and sold under the trademark BULLET VALVE (see, e.g., U.S. Pat. No. 9,074,699 of Jamison et al. and US Patent Application Publication 2014/0261804 of Neff et al. showing several other such cartridges). The illustrated valve is a single-diaphragm axial valve. The valve is "axial" in that the discharge flow from the cartridge is axial. The inlet flow is radial. Alternative embodiments involve so-called "standard" valves wherein both the inlet flow and the outlet flow are radial. Other cartridge valves may be alternatively used.

The exemplary cartridge comprises a multi-piece body 200 (having main structural pieces 202, 204, 206, and 208 from an inboard end (within the flow control unit body) to an outboard end (outside of the flow control unit body). it also includes appropriate o-rings or other seals and an end cap 210 bearing an electrical connector 212 (connected via electrical leads to the timing circuit 32).

The cartridge also has an axially-shiftable valve member 222. The cartridge is a solenoid valve cartridge wherein the solenoid 224 comprises a solenoid coil 226 contained in a bobbin 228 held stationary by the housing. The solenoid further includes a distal end pole piece 232 also held stationary and extending within an outboard or distal portion of the coil.

The solenoid further includes an armature 240 integrated with the valve member 222. A portion of the armature extends within an inboard or proximal end portion of the coil. A spring 242 biases the armature and valve in one particular orientation (either toward a closed condition (position) or an open condition). In the illustrated example, the biasing is toward a closed condition so that the valve is a normally closed valve. Energizing of the coil may overcome the bias and shift the valve member from the closed condition to the open condition.

The exemplary valve member closed condition corresponds to an extended condition and the open condition corresponds to a retracted condition.

The exemplary cartridge body has one or more radial inlet ports 250 and an axial outlet port 252. Alternative valves may have radial outlets. The exemplary cartridge housing comprises a valve seat 254 surrounding the axial outlet port 252. The valve seat engages an end face of a head 260 of the valve member in the closed condition. The end face of the head disengages from the seat as the valve is retracted toward the open condition.

Alternative similar valves involve the open condition being retracted with an oppositely facing seat engaging an underside of the head.

Returning to FIG. 1, the controller 34 may receive user inputs from one or more input devices 96 (e.g., switches, keyboard, or the like), sensors (some not shown, e.g., pressure sensors and temperature sensors at various system locations) and/or other output devices (e.g., flat panel display 98, lights, and the like). The controller may be coupled to the sensors and controllable system components (e.g., valves, the compressor motor, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

In one retrofit example, the baseline controller 34 sends continuous AC or DC power appropriate for the flow control valves of the baseline flow control unit 31 (e.g., 24 VDC) signals. In this example, the controller 34 starts the power when the float switch 72 indicates mix level in the reservoir has dropped to a low threshold and then terminates power when the flow switch indicates a higher threshold associated with a full condition.

Figure 6:
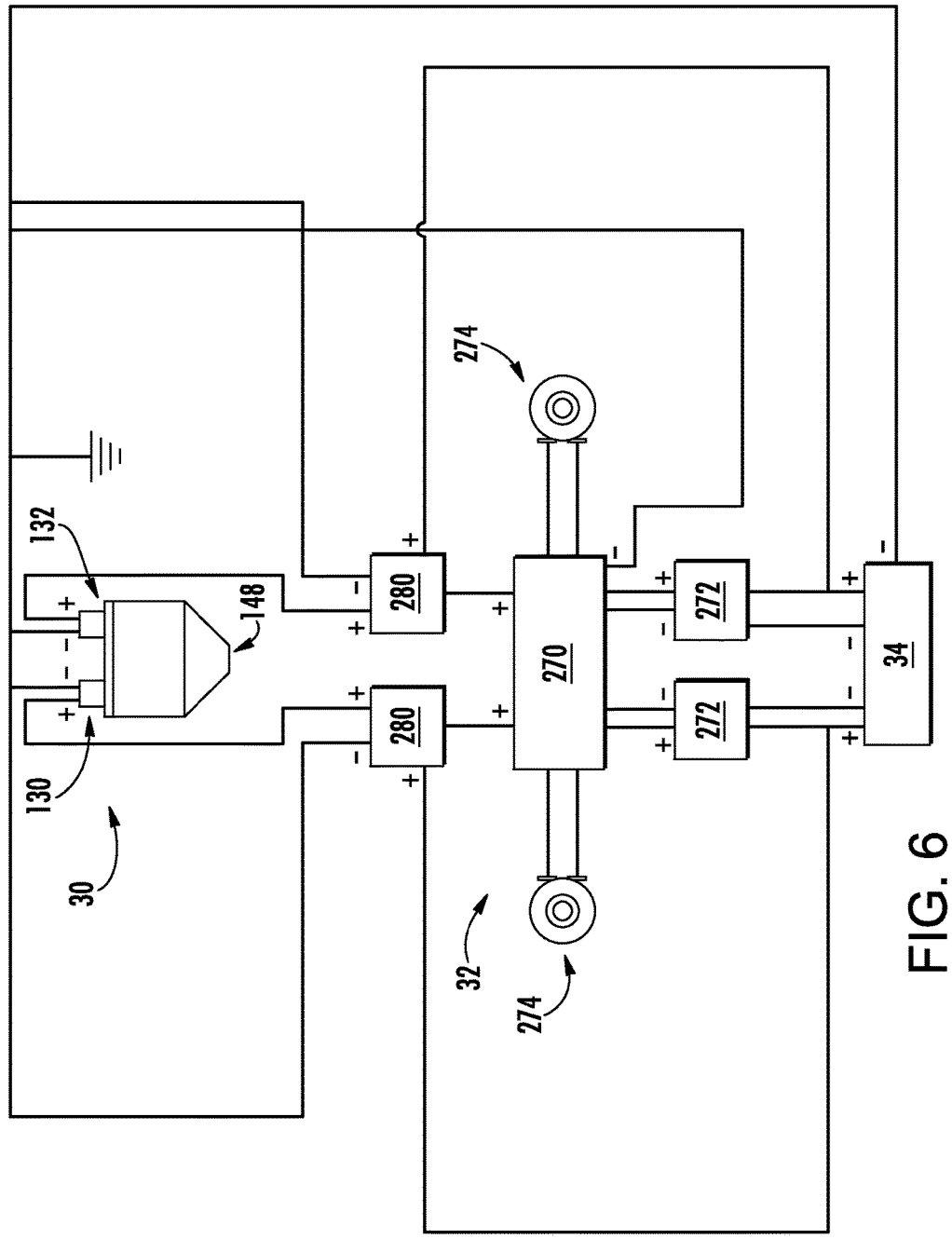
FIG. 6 is a schematic partial view of a retrofit timing circuit controlling the valve assembly.

FIG. 6 shows an exemplary configuration of the retrofit timing circuit 32. The timing circuit 32 has a processor circuit (e.g., including a microprocessor) 270. A common ground is shown throughout. Optocouplers 272 convert the high voltage signals from the controller 34 to low voltage input signals for the microprocessor circuit, isolating the low voltage microprocessor circuit from the high voltage of the controller 34 output. The timing circuit 32 has respective potentiometers 274 for the two valves coupled to the microprocessor circuit.

The microprocessor measures each potentiometer resistance and creates a PWM signal proportional to the measured resistance. The potentiometer resistance can be adjusted manually via a knob to set the desired flow rate. The PWM signal drives the gate of a power transistor 280 which amplifies the low voltage PWM signal and sends a high voltage PWM signal to the associated flow control valve 130, 132. Eventually the float switch signals that the mix tank is full and the machine control stops the signal.

The period of the PWM signal should be long enough that the solenoid valves do not have to open and close so often that their reliability or life is harmed. For example, in an exemplary system it might take about eight seconds to refill the mix tank. If the period of the PWM signal is set a two seconds: for half maximum flow the valve would be open for one second and then closed for one second, repeated for four periods or cycles. If more flow was desired, then the open signal would be increased in length beyond one second and the closed signal would be correspondingly decreased in length so that the total period would still be two seconds. If less flow was desired, then the length of the open signal would be decreased and the length of the closed signal would be increased but their total would remain two seconds. The PWM signal for the water valve and the syrup valve can thus be adjusted independently to achieve the proper ratio of syrup and water in the mix tank when it is refilled.

The system may be made using otherwise conventional or yet-developed materials and techniques.

Figure 4:
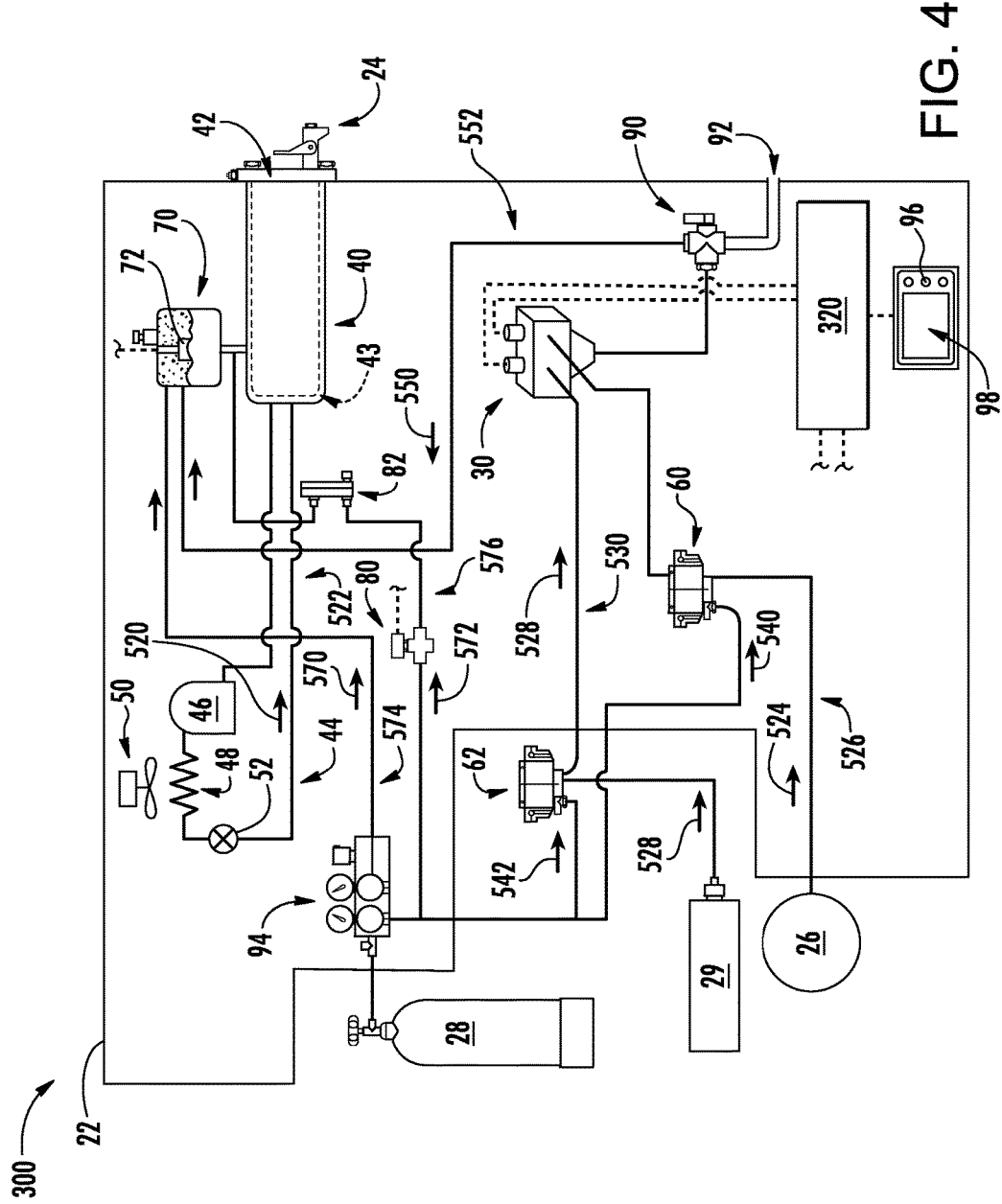
FIG. 4 is a partially schematic view of an alternate FCB dispensing system.

FIG. 4 shows a system 300 wherein the controller 320 is configured to directly output the PWM electrical power to the cartridges. This may represent a new-build system based on the FIG. 2 baseline or may represent a retrofit where the controller 320 replaces the controller 34.

Figure 5:
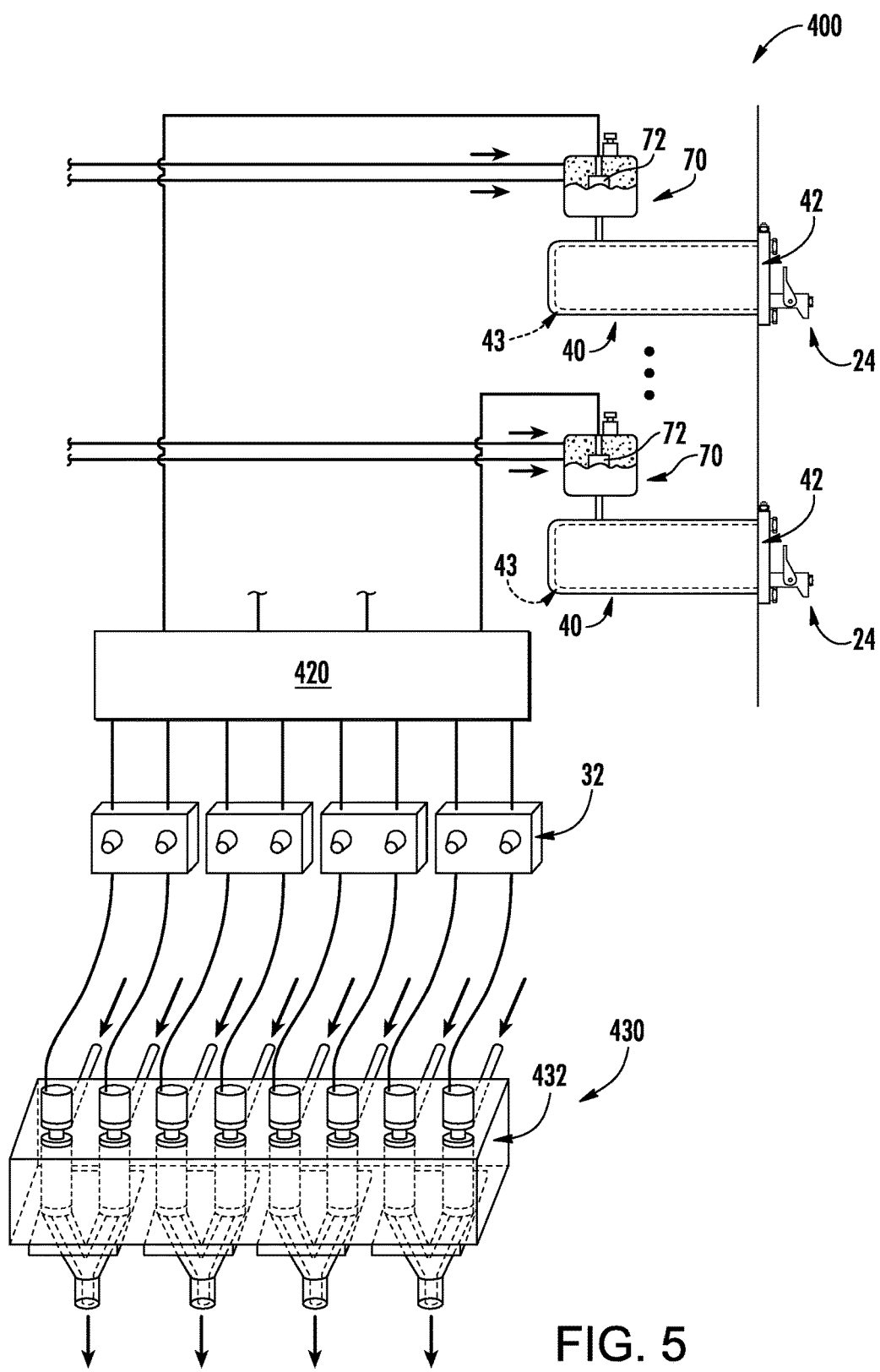
FIG. 5 is a partial partially schematic view of another alternate FCB dispensing system.

FIG. 5 shows a system 400 having multiple freezing cylinders for dispensing different flavors of FCB. Each cylinder may be connected to a different syrup source (not shown) of a different syrup flavor. A single carbon dioxide source and a single ultimate water source may service all the freezing cylinders. Each freezing cylinder (and its reservoir, etc.) may have an associated pair of cartridge-type water and syrup valves as discussed above. In some implementations a single flow control unit 430 may service more than one of the cylinders such as by having a single main block 432 having the cartridge compartments for receiving the water and syrup cartridges of all the cylinders (or of some smaller group of the cylinders). The exemplary system 400 is shown reflecting a similar modification of a baseline multiple-cylinder system as the system 20 is a modification of the system 21. A plurality of the timing circuits 32 are added to the baseline controller 420. These circuits 32 may be separate units (e.g., separate units for each pair of cartridges as shown with separate housings or for each cartridge) or may be combined. For ease of illustration, features such as the housing, various valves, sensors, and pumps, the refrigeration system(s), the sampling outlet(s), and the like are not shown but may be present in similar fashion.

Additionally, other single- or multi-cylinder machines may serve as baselines for similar modifications. In various implementations, a single cartridge valve or single pair of cartridge valves may service multiple freezing cylinders. Among alternatives to a microprocessor based timing circuit as the timing circuit 32 are circuits based on bipolar timers such as the 555-series combined with other discrete components as may be appropriate.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A dispensing apparatus (20; 300; 400) comprising:
a freezing cylinder (40);
a water flowpath (526);
a first controllable valve (130) along the water flowpath;
a syrup flowpath (528), merging with the water flowpath and proceeding as a water/syrup flowpath (552) to the freezing cylinder; and
a second controllable valve (132) along the syrup flowpath,
wherein the first controllable valve and the second controllable valve each comprise:
a valve body (144; 432) having a cartridge compartment (164,166), an inlet (176) to the cartridge compartment, and an outlet (178) from the cartridge compartment; and
a valve cartridge (162) comprising:

a cartridge body (200) mounted in the cartridge compartment and having a first port (250) and a second port (252), wherein the first port is a pair of radial ports and the second port is an axial port;

a valve element (222) carried by the cartridge body and shiftable between:

a first condition permitting communication between the first port and the second port to permit communication between the inlet and the outlet; and a second condition blocking communication between the first port and the second port to block communication between the inlet and the outlet; and a solenoid (224) carried by the cartridge body and coupled to the valve element to drive movement of the valve element.

2. A dispensing apparatus (20; 300; 400) comprising:
a freezing cylinder (40);
a water flowpath (526);
a first controllable valve (130) along the water flowpath;
a syrup flowpath (528), merging with the water flowpath and proceeding as a water/syrup flowpath (552) to the freezing cylinder;
a second controllable valve (132) along the syrup flowpath,
a mix reservoir (70) along the water/syrup flowpath, and
a carbon dioxide flowpath (572, 574) merging with the water/syrup flowpath, the carbon dioxide flowpath comprising:

a first branch (574) extending to the mix reservoir; and
a second branch (576) extending to the water/syrup flowpath between the mix reservoir and the freezing cylinder;

wherein the first controllable valve and the second controllable valve each comprise:

a valve body (144; 432) having a cartridge compartment (164,166), an inlet (176) to the cartridge compartment, and an outlet (178) from the cartridge compartment; and a valve cartridge (162) having a unitary construction so as to allow removal from the valve compartment and replacement as a unit, the valve cartridge comprising:

a cartridge body (200) mounted in the cartridge compartment and having a valve seat;

a valve element (222) carried by the cartridge body and having a head shiftable between a first condition disengaged from the valve seat and permitting communication between the inlet and the outlet and a second condition engaged to the valve seat and blocking communication between the inlet and the outlet;

and a solenoid (224) carried by the cartridge body and coupled to the valve element to drive movement of the valve element.

3. The apparatus of claim 2, wherein, for the first controllable valve and the second controllable valve, the cartridge body:
is captured to the valve body by a capture plate (190);
has a threaded engagement with the valve body; and/or
has a snap-fit engagement with the valve body.

4. The apparatus of claim 2, further comprising:
a carbon dioxide tank (28) connected to the carbon dioxide flowpath.

5. The apparatus of claim 2, wherein:
the first controllable valve and the second controllable valve have identical cartridges.

6. The apparatus of claim 2 further comprising:
a controller (32, 34; 320; 32, 420) configured for pulse width modulated operation of the first controllable valve and the second controllable valve.

7. The apparatus of claim 6 wherein the controller comprises:
a main controller (34; 420); and
a manually-adjustable pulse width modulated timing circuit (32) intervening between the main controller and the first controllable valve and the second controllable valve.

8. The apparatus of claim 6, wherein the controller is configured to:
output separate pulse width modulated power to the first controllable valve and the second controllable valve.

9. The apparatus of claim 2, further comprising:
a refrigeration system (44) with the freezing cylinder as a heat exchanger (43).

10. A method for using the apparatus of claim 2, the method comprising:
running the freezing cylinder to discharge a product from an outlet.

11. The method of claim 10 further comprising:
removing, as a unit, the valve cartridge of one or both of the first controllable valve and the second controllable valve; and
replacing, as a unit, the removed cartridge with a replacement cartridge.

12. The method of claim 11 wherein:
the removing comprises removing a capture plate.

13. The method of claim 10 further comprising:
providing separate pulse width modulated power to the first controllable valve and the second controllable valve.

14. The method of claim 13 wherein:
the separate pulse width modulated power to the first controllable valve and the second controllable valve are of different duty cycles.

15. The method of claim 14 further comprising:
manually adjusting the different duty cycles.

16. The method of claim 15 wherein:
the manually adjusting is of respective timing circuits intervening between a main controller and the first controllable valve and the second controllable valve.

17. The method of claim 10 used to dispense a frozen carbonated beverage product.

* * * * *